ABSTRACT
United States Patent [19]
Alcock et al.

[11] 3,977,834
[45] Aug. 31, 1976

[54] MULTI-BED, MIXED-PHASE, DOWN-FLOW REACTOR

[75] Inventors: Leslie Alcock, Bexleyheath; Terence Michael Lazenby, Bagshott, both of England

[73] Assignee: The British Petroleum Company Limited, London, England

[22] Filed: Nov. 22, 1974

[21] Appl. No.: 526,398

[30] Foreign Application Priority Data
Dec. 7, 1973   United Kingdom............... 56743/73

[52] U.S. Cl. ........................... 23/288 R; 23/288 K; 23/284; 208/108; 208/146; 208/147; 208/48 Q; 261/114 TC; 261/97
[51] Int. Cl.² .................... B01J 8/04; B01F 3/04
[58] Field of Search ............. 23/288 R, 288 K, 284; 208/108, 146, 147, 48 Q; 261/114 TC, 16, 97

[56] References Cited
UNITED STATES PATENTS

| | | |
|---|---|---|
| 3,218,249 | 11/1965 | Ballard et al................... 23/288 R X |
| 3,458,289 | 7/1969 | King et al.......................... 23/288 R |
| 3,489,529 | 1/1970 | Dudyeh et al.................. 23/288 R X |
| 3,541,000 | 11/1970 | Hanson et al.................. 23/288 R X |
| 3,598,541 | 8/1971 | Hennemuth et al. ............. 23/288 R |
| 3,787,189 | 1/1974 | Muffat et al. .................. 23/288 K X |
| 3,895,919 | 7/1975 | Forster et al..................... 23/288 K |

Primary Examiner—James H. Tayman, Jr.
Attorney, Agent, or Firm—Morgan, Finnegan, Pine, Foley & Lee

[57] ABSTRACT

A device suitable for mixing and redistributing reactants between the beds of a multi-bed, mixed phase down flow reactor comprising means for injecting gas into the reactor having a number of parallel perforated pipes extending across the width of the reactor and a number of quench boxes also extending across the width of the reactor. The quench boxes also have an inner and two outer compartments, passages through the walls between the inner and outer compartments, passages in the roof of either the inner or outer compartments and passages in the floor of whichever of the inner or outer compartments has no passages in its roof.

12 Claims, 5 Drawing Figures

MULTI-BED, MIXED-PHASE, DOWN-FLOW REACTOR

This invention relates to multi-bed downflow hydrocatalytic reactors and particularly to devices for mixing and redistributing the mixed phase reactants between the beds.

In one form of reactor for hydrocatalytic processes the catalyst is disposed in a series of separated beds. Some of the hydrogen is added with the feed but additional hydrogen may be injected between the beds. Such a system is particularly useful for exothermic reactions, since the additional hydrogen can act as a coolant to control the inlet temperature to the next bed and thereby help to control the temperature increase along the reactor. Rapid and efficient mixing of the added hydrogen with the reactants is obviously desirable particularly when the reactants are at least partly in the liquid phase. This mixing is accomplished in a quench box placed between the catalyst beds. Besides mixing the added hydrogen with the reactants a quench box may also serve to redistribute the reactants across the reactor area and so prevent chanelling or separation of the phases.

In any multi-bed reactor it is obviously desirable to keep the reactor dimensions to a minimum, and adding quench boxes between catalyst beds tends to increase the overall length of the reactor. The problem of keeping reactor dimensions within reasonable bounds becomes particularly acute with very large reactors which may have capacities of 50,000 BPSD and catalyst inventories of several hundred tons. However with such large reactors the cross beams supporting the catalyst beds also have to be large and may have a depth of at least 30 cms. The present invention utilises the space between such beams for placing the devices used to mix and redistribute the reactants.

According to the present invention a device suitable for mixing and redistributing reactants between the beds of a multi-bed, mixed-phase down-flow reactor comprises means for injecting gas into the reactor having a number of parallel perforated pipes extending across the width of the reactor and a number of quench boxes also extending across the width of the reactor, said quench boxes having an inner and two outer compartments, passages in the roof of either the inner or outer compartments, passages through the walls between the inner and outer compartments, and passages in the floor of whichever of the inner or outer compartments has no passages in its roof.

The usual gas injection means for multi-bed reactors is a sparger ring and normally there is a single quench box between each bed. With the present invention the gas injection means is, in effect, a form of grid and, instead of a single quench box, a number of rectangular boxes are used. This, as indicated above, allows the device to be placed between horizontal beams, but the invention is not limited to such a location and may be used in any situation where multiple quench boxes would have advantages over a single box.

The gas injection means must obviously have an inlet pipe extending through the wall of the reactor and this is preferably a pipe at right angles to the parallel perforated pipes on a higher horizontal plane with vertical pipes connecting it to the parallel perforated pipes. With this system the inlet pipe can be above any horizontal beams and may be in the base of the catalyst bed with the vertical pipes passing through the support grid for the catalyst bed.

The perforations in the parallel pipes may be rows of holes on the under surfaces of the pipes. The holes preferably direct the hydrogen at an angle of from 85° to 5° to the vertical and there may be a row of holes on either side of each pipe. The number of perforated pipes will depend on a number of factors including the number of beams, and may conveniently be from 2 to 10 in number.

The quench boxes may be directly below the perforated pipes, one for each pipe, so that the number of boxes is also from 2 to 10.

The passages in the roof of the quench boxes are preferably in the roof of the outer compartments, with the passages in the floor being in the floor of the inner compartments. Each quench box may extend across the width of the reactor or it may be sub-divided along its length for ease of construction and/or placement and removal.

Since the area of the passages in the roof is very much less than the reactor cross section, the rate of flow of the reactants is increased considerably, creating a venturi effect and ensuring good mixing. The area of the passages between the outer and inner compartments of the quench box may be substantially the same as the area of the roof passages. The area of the passages in the floor of the quench boxes is preferably as large as possible and larger than the area of the roof and inter-compartment passages, suitable ratios being from 10:1 to 25:1.

Other dimensions and ratios of the quench boxes will depend on the particular situation in which it is to be used, particularly on the overall reactant flow rate. A particular feature of the present invention is that the quench boxes extend across a large part of the reactor cross-section and may cover from 70 to 90 percent of the reactor cross section. As compared with a single central quench box, therefore, they can be relatively shallow with a width to height ratio of from 5:1 to 15:1. The ratio of the volume of the outer compartments to the volume of the inner compartment may be from 0.5:1 to 1:1 when the flow is from the outer to inner compartments. If the flow is the other way the ratios will be reversed.

The present invention includes a multi-bed, down-flow reactor having a reactant mixing and redistributing device as previously described. The device may also have associated with it and below it a perforated liquid hold-up and distribution tray to give added assurance that the reactants and hydrogen are distributed evenly across the whole of the next catalyst bed. The passages in the tray may have chimneys and cowls above them to regulate the liquid level on the tray and control the passage of the reactants through the tray. The cowls may conveniently be double-entry cowls with separate entrances for liquid and gas, together with associated baskets extending into the catalyst bed as described in U.K. Pat. No. 1,113,751. It may, however, be possible to save additional space by dispensing with a separate distribution tray, making the upper surface of the quench boxes the tray and placing chimneys and cowls above the passages in the roof, if necessary.

The device and distribution tray may have a small number (e.g. 4) of relatively large diameter holes (e.g. 0.5 percent of the reactor cross section) through them and sealed from them to allow catalyst loading and unloading without removing the boxes and trays from the reactor.

The present invention is, as indicated earlier, suitable for use with hydrocatalytic processes in which at least part of the reactants are in the liquid phase. It is thus particularly suitable for the hydrocatalytic treatment of petroleum fractions boiling above 300°C. Suitable feedstocks are thus wax distillate fractions boiling within the range 300°– 550°C, atmospheric residues boiling above 300°C, and vacuum residues boiling above 550°C. Such feedstocks are normally hydrotreated for the purpose of desulphurisation or hydrocracking under the following ranges of conditions.

|  |  | Broad range | Preferred range for Desulphurisation | for Hydrocracking |
|---|---|---|---|---|
| Temperature | °C | 300 – 450 | 320 – 430 | 350 – 450 |
| Pressure | bars gauge | 35 – 210 | 35 – 170 | 70 – 210 |
| Space velocity | v/v/hr | 0.2 – 5 | 0.5 – 3.0 | 0.5 – 3.0 |
| Hydrogen treating rate | m³/m³ | 300 – 3600 | 360 – 1800 | 720 – 3600 |

The space velocities and hydrogen treating rates above are the overall treating rates. The proportion of hydrogen added initially and that used as quench will vary depending on the exothermicity of the reaction, which in its turn will depend in part on the nature of the feedstock. In general, however, the amount of hydrogen used as quench may vary from 10 –60 percent of the total hydrogen.

The invention is illustrated with reference to the drawings accompanying the Provisional Specification in which.

Figure 1:
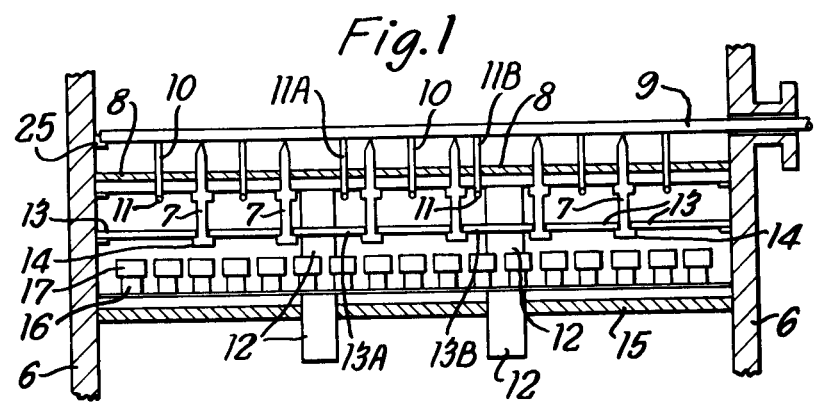
FIG. 1 is a cross-section of part of a cylindrical reactor according to the present invention.
Figure 2:
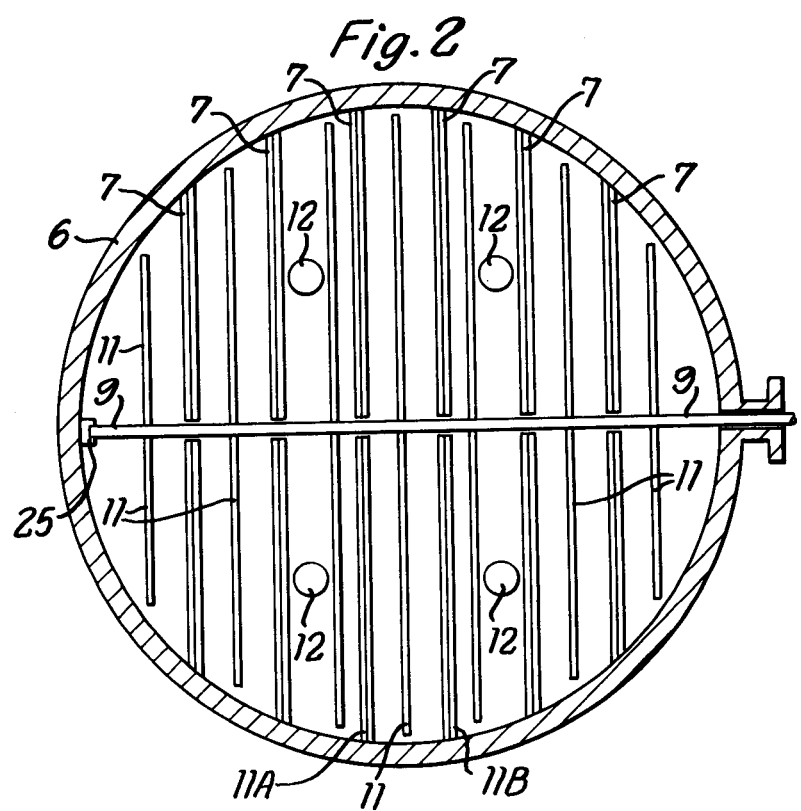
FIG. 2 is a plan view of part of a cylindrical reactor according to the present invention.

In FIGS. 1 and 2, a cylindrical reactor has a wall 6. Horizontal beams 7 firmly fixed to the wall, support grid 8 on which is placed a catalyst bed (not shown). A gas inlet pipe 9 passes through wall 6 and extends across the reactor at right angles to the beams 7 to a support 25. Vertical pipes 10 extend down from pipe 9 passing through the grid 8 between the beams 7. Horizontal pipes 11 connected to the vertical pipes 10 extend across the width of the reactor between the beams. Pipes 11 are mid-way between the beams except for pipes 11A and 11B which are offset to allow four catalyst dump tubes 12 to extend from the grid 8 downwardly. Pipes 11 have two rows of holes (not shown) on their under surfaces at an angle of 60° to the vertical, except for pipes 11A and 11B which have one row on the side nearest to the catalyst dump tubes 12.

A series of quench boxes 13 are removeably placed on T-pieces 14 of beams 7. Each box extends across the reactor between the beams 7 and below the perforated pipes 11. The catalyst dump tubes 12 pass through passages in boxes 13A and 13B, seals preventing leakage of gas or liquid down the gap between the tubes and the boxes. Details of the boxes will be discussed hereafter.

Below the quench boxes is a liquid hold-up and distribution tray 15 having chimneys 16 with cowls 17 through which liquid and gas pass to the next catalyst bed (not shown) below the tray.

Figure 3:
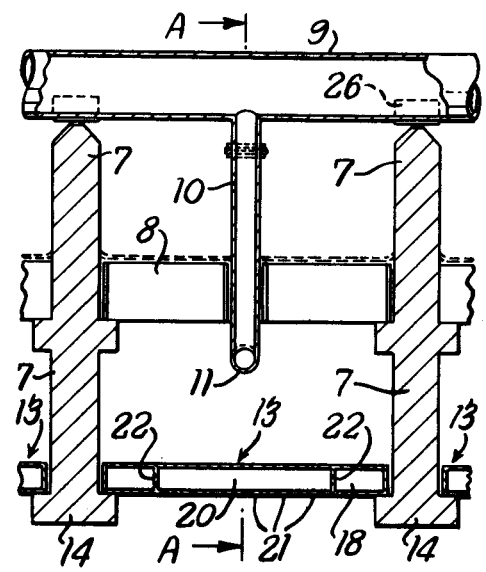
FIGS. 3 and 4 are enlarged, more detailed, sections of part of the FIG. 1.
Figure 4:
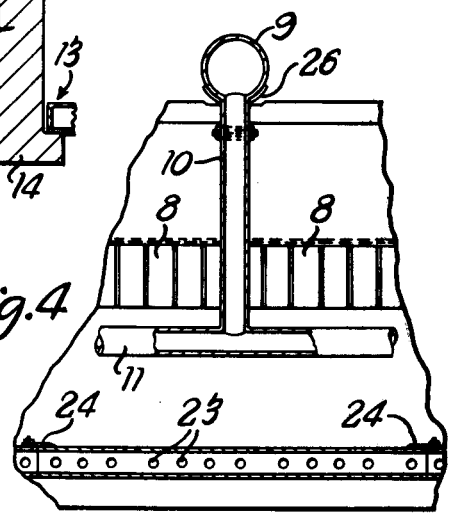
Figure 5:
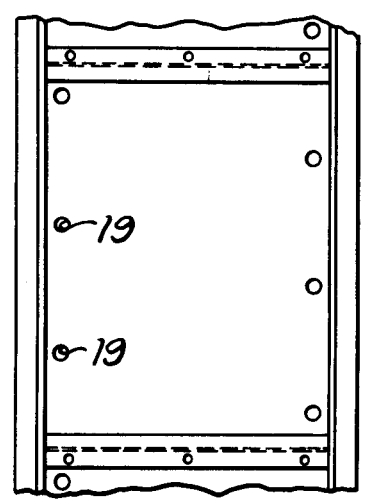
FIG. 5 is a plan view of part of a quench box.

In FIGS. 3, 4 and 5 the same reference numerals are used as for FIGS. 1 and 2. FIG. 4 is a section along the line A—A of FIG. 3. FIGS. 3 and 4 show, in more detail, inlet pipe 9, and one vertical pipe 10 passing through grid 8 to a perforated pipe 11. Cradles 26 on the top of beams 7 help to support the inlet pipe 9. Quench boxes 13 rest on T-pieces 14 of beams 7. Quench boxes 13 have two outer compartments 18 having passages 19 (FIG. 5) in their roofs and solid floors and an inner compartment 20 with a solid roof and passages 21 in its floor. The walls 22 between the inner and outer compartments have passages 23 (FIG. 4). The boxes 13 are formed of separate sections held together by flanges 24.

In operation liquid and gas reactants pass downwardly through the catalyst bed and grid 8 onto the roofs of quench boxes 13. Quench hydrogen is injected through pipes 9, 10 and 11, the perforated holes in pipes 11 directing the hydrogen downwardly and outwardly towards the outer compartments of quench boxes 13. The reactants and the quench hydrogen flow through the outer compartments 18 and inner compartments 20, being thoroughly mixed as they change direction. From the passages 21 in the floor of inner compartments 20, the reactants and hydrogen flow onto the tray 15 and through chimneys 16 to the next catalyst bed.

Although only one system beneath one catalyst bed is shown, it is to be understood that a multi-bed reactor may contain a number of such systems below each catalyst bed except the last.

We claim:

1. A multi-bed, mixed phase, down-flow reactor containing cross beams for supporting a grid for supporting each catalyst bed and containing gas/liquid transfer plates characterized in that the horizontal spaces between the cross beams contain a device suitable for mixing and redistributing reactants between the beds, which device comprises means for injecting gas into the reactor having a number of parallel, perforated pipes extending horizontally across the width of the reactor beneath a pipe and above a gas/liquid transfer plate, and a number of quench boxes also extending across the width of the reactor, the quench boxes having an inner and two outer compartments, passages in the roof of the outer compartments, passages through the walls between the inner and outer compartments, and passages in the floor of the inner compartments.

2. A device according to claim 1 wherein the ratio of the area of the passages in the floor of the quench boxes to the area of passages in the roof and between compartments is in the range of 10:1 to 25:1.

3. A device according to claim 1 wherein the quench boxes cover from 70 to 90 percent of the reactor cross section.

4. A device according to claim 1 wherein the quench boxes are shallow with a width to height ratio in the range of from 5:1 to 15:1.

5. A device according to claim 1 adapted for flow from outer to inner compartments of the quench boxes wherein the ratio of the volume of the outer to the inner compartment is in the range of 0.5:1 to 1:1.

6. A device according to claim 1 adapted for flow from inner to outer compartments of the quench boxes wherein the ratio of the volume of the inner to the outer compartments is in the range of 0.5:1 to 1:1.

7. A multi-bed, mixed-phase, down-flow reactor containing cross beams for supporting a grid for supporting each catalyst bed and containing gas/liquid transfer plates characterized in that the horizontal spaces between the cross beams contain a device suitable for mixing and redistributing reactants between the beds, which device comprises means for injecting gas into the reactor having a number of parallel, perforated pipes extending horizontally across the width of the reactor beneath a pipe and above a gas/liquid transfer plate, and a number of quench boxes also extending across the width of the reactor, the quench boxes having an inner and two outer compartments, passages in the roof of the inner compartments, passages through the walls between the inner and outer compartments, and passages in the floor of the outer compartments.

8. A device according to claim 7 wherein the ratio of the area of the passages in the floor of the quench boxes to the area of passages in the roof and between compartments is in the range from 10:1 to 25:1.

9. A device according to claim 7 wherein the quench boxes cover from 70 to 90 percent of the reactor cross section.

10. A device according to claim 7 wherein the quench boxes are shallow with a width to height ratio in the range of from 5:1 to 15:1.

11. A device according to claim 7 adapted for flow from outer to inner compartments of the quench boxes wherein the ratio of the volume of the outer to the inner compartments is in the range 0.5:1 to 1:1.

12. A device according to claim 1 adapted for flow from inner to outer compartments of the quench boxes wherein the ratio of the volume of the inner to the outer compartments is in the range 0.5:1 to 1:1.

* * * * *